July 9, 1963

S. H. BAKER ETAL

3,096,604

ROW CROP HARVESTING APPARATUS

Filed May 31, 1960

INVENTORS
SLADE H. BAKER
ROLLO J. BAKER, JR.
THOMAS ROBERT BURNIGHT
BY George F. Williamson & H. Dale Palmatier
ATTORNEYS July 9, 1963

S. H. BAKER ETAL 3,096,604

ROW CROP HARVESTING APPARATUS

Filed May 31, 1960

INVENTORS
SLADE H. BAKER
ROLLO J. BAKER, JR
BY THOMAS ROBERT BURNIGHT
George F. Williamson & H. Dale Palmatier
ATTORNEYS July 9, 1963

S. H. BAKER ETAL 3,096,604

ROW CROP HARVESTING APPARATUS

Filed May 31, 1960

INVENTORS
SLADE H. BAKER
ROLLO J. BAKER, JR.
BY THOMAS ROBERT BURNIGHT

George F. Williamson & H. Dale Palmatier
ATTORNEYS

United States Patent Office 3,096,604
Patented July 9, 1963

3,096,604
ROW CROP HARVESTING APPARATUS
Slade Hale Baker and Rollo John Baker, Jr., Akron, Iowa, and Thomas Robert Burnight, 2221 Essex Road, Minneapolis, Minn.
Filed May 31, 1960, Ser. No. 32,876
15 Claims. (Cl. 56—18)

This invention relates to a row crop harvesting machine and particularly to such machines which are adapted for harvesting row crops upon which the fruits are supported at an elevated position by the stalk, such as corn and the like.

Although corn pickers of various types have been known in the past, it is common knowledge that such corn pickers do not perform adequately and do not do a thorough picking job particularly in fields which have been subjected to severe wind and other types of damaging storms. Such presently known corn pickers are also inadequate for late season harvesting of corn after a substantial quantity of snow has fallen onto the field. In the case of storm damaged corn wherein many of the stalks are blown down and are either lying directly on the ground surface or are lying against each other in a substantially tangled relationship, it has been common practice to attempt hand picking of the corn which, of course, is extremely laborious and expensive and frequently a picker will be tried on the field to harvest what small proportion of the existing corn as can be obtained, which may or may not be sufficient to pay for the cost of the fuel necessary to drive the corn picker.

All presently known corn picking machines employ forwardly extending snouts which are supposedly designed to straighten corn stalks and allow the stalks to pass rearwardly through the stalkway of the corn picker so that the ears may be picked off. However, under adverse conditions such as those hereinbefore described, it has been found that these snouts are inadequate for the purpose intended and that only a very small proportion of a damaged field of corn is harvested. Furthermore, it has been found that even under ideal conditions wherein the corn is substantially all in an upright condition, presently known corn pickers do not obtain the maximum yield from a field because frequently stalks will be somewhat out of alignment in the row and certain of the ears will have fallen off onto the ground.

It has further been experienced with the use of the commonly employed snouts at the forward end of the corn picker, that when the harvester is traveling along the field at a reasonable rate of speed, such as three miles an hour, and if one of the snouts actually gets under a stalk which is bent down and directed off to one side of the row, the snout will cause the stalk to whip upwardly and frequently over in the other direction causing the ears of corn to fly off the stalk and land on the ground where pickers of the type employing such snouts cannot reach those ears of corn, and for all practical purposes, such ears are lost.

It is to the correction and elimination of these and other disadvantages, to which our invention is directed, along with the inclusion therein of other novel and desirable features.

An object of our invention is to provide in a harvesting machine, a novel improvement of simple and inexpensive construction and operation which adapts the harvesting machine for substantially greater efficiency and versatility for harvesting row crops of the type which carry fruit at an elevated position on the stalk.

Another object of our invention is the provision in a crop row harvesting machine of improved apparatus for gathering and uplifting corn so that it may be properly collected and harvested by the harvesting apparatus of the machine under adverse field conditions as well as under ideal field conditions.

A further object of our invention is to provide in a row crop harvesting machine, novel apparatus which positively engages substantially all the stalks of the row crop which are lying on the ground or just above the ground in the spaces between the crop rows and which carries such stalks and ears of corn or the like inwardly toward the conventional fore-and-aft stalkway of the harvesting machine for thoroughly gathering all of the fruits.

A further object of our invention is the provision in a crop row harvesting machine of novel and improved apparatus which operates equally well in flat surfaced field and fields wherein the ground is hilled along the crop row for gathering the crop from the spaces between the crop rows and carrying the same into the conventional stalkway and harvesting apparatus of the machine.

These and other objects and advantages of my invention will more fully appear from the following description made in connection with the accompanying drawings wherein like reference characters refer to the same or similar parts throughout the several views and in which:

FIG. 9 is a detail diagrammatic perspective view showing the application of the present invention to another row crop harvester for harvesting such crops as soy beans and the like;

In the embodiment of the invention shown in FIGS. 1-8, the invention is embodied or incorporated into a self-propelled corn picker, indicated in general by numeral 10, which is of conventional construction for the most part and includes a tractor portion 11, having the usual supporting structure 12 and ground travel support wheels 13, and having a control station 14 with a seat 15 for the operator who operates the various controls, indicated in general by letter C.

Figure 1:
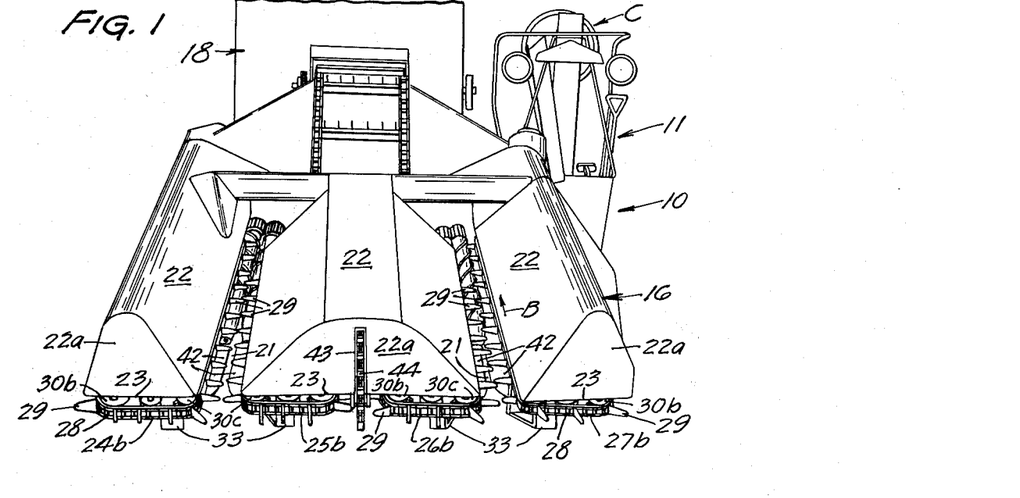
FIG. 1 is a perspective view of the harvester as viewed from the front.
Figure 2:
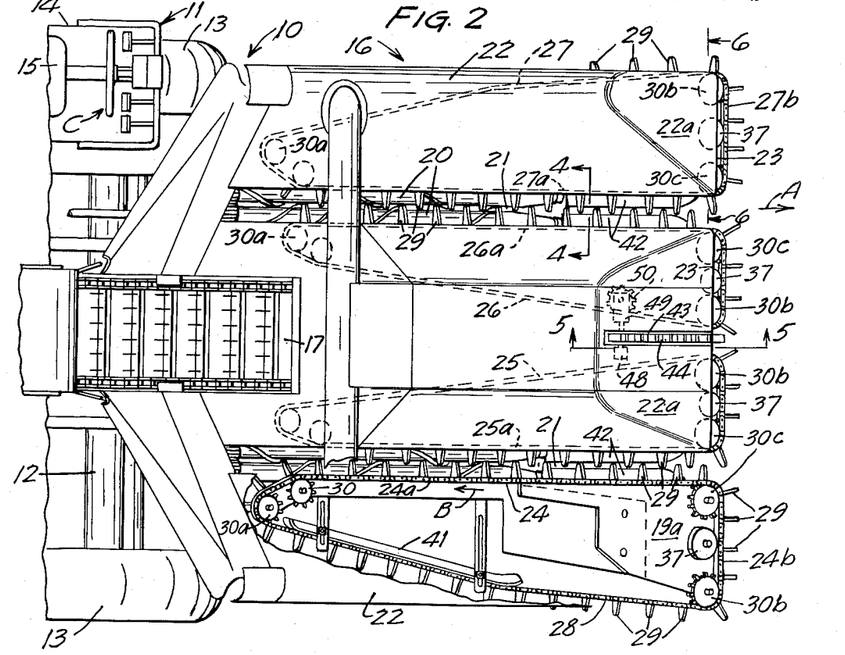
FIG. 2 is an enlarged top plan view of the forward portion of the harvester, and having portions of the housing broken away in order to show clarity of detail.
Figure 3:
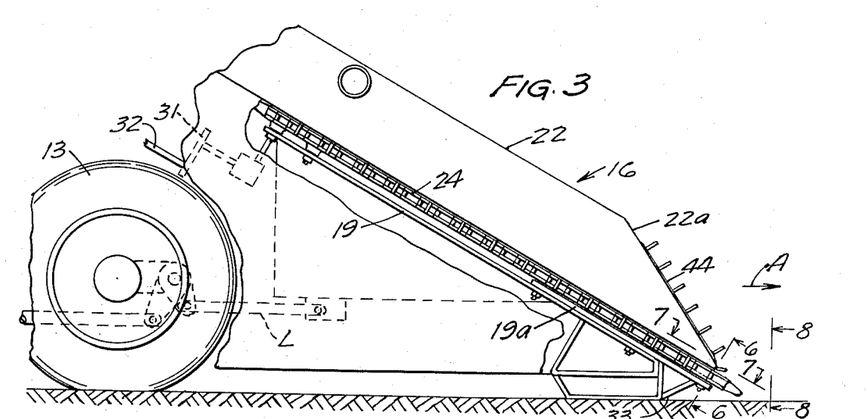
FIG. 3 is a side elevation view of the invention with a portion of the housing broken away for clarity of detail.
Figures 4, 5, 6, 7:
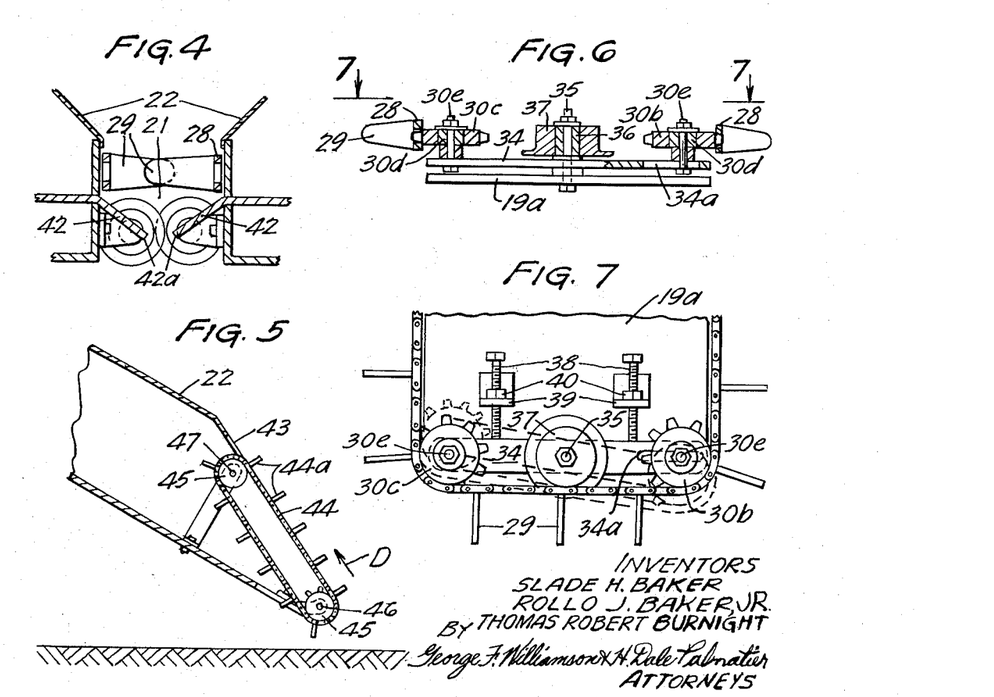
FIG. 4 is an enlarged detail section view taken on a plane as indicated at 4—4 in FIG. 2.
FIG. 5 is an enlarged detail section view taken on a plane as indicated at 5—5 in FIG. 2.
FIG. 6 is an enlarged detail section view taken on an upright but inclined plane as indicated at 6—6 in FIGS. 2 and 3.
FIG. 7 is a detail plan view taken on a plane indicated substantially at 7—7 in FIGS. 3 and 6.

The corn picker 10 also has a picker unit 16 adjustably mounted in a forward position on the supporting structure 12 of the tractor unit 11, and adapted to be raised and lowered through operation of the conventional linkage L shown in dotted lines in FIG. 3. The picker unit 16 is provided with a rearwardly moving elevator 17 for delivering the ears of corn to the husking unit which is shown in general by the numeral 18. As previously explained, all of this general construction in the corn harvester is of a conventional nature and is similar to that shown in substantial detail in U.S. Patent 2,641,887.

The picker unit 16 is provided with the conventional frame structure 19 which is connected in the conventional manner to the support structure 12 of the tractor unit and which is connected by linkage L so that the picker unit may be lifted off the ground. The picker unit 16 has the conventional snapping rolls 20 which are disposed in the fore-and-aft stalkways 21 which are defined by the housing 22. As is conventional in corn pickers the corn stalks pass rearwardly along the stalkways 21 into the snapping rolls which cause the ears to be removed from the stalks, and the ears will subsequently be collected and delivered rearwardly by the elevator conveyor 17 into the husking unit 18. It will be understood that the snapping rolls 20 and housing 22 are inclined in a forwardly and downwardly sloping direction in the conventional manner.

It will be noted in the present invention that the forward end portions 22a of the housing 22 are extended substantially forwardly from the forward ends of the snapping rolls so that the stalkways 21 are of substantially uniform width throughout their entire length. The forward edges 23 of the housing are substantially linear and are disposed normal to the stalkways 21 and to the direction of travel of the picker which is indicated by arrow A. The picker unit 16 is also provided with a plurality of conveyors 24, 25, 26 and 27 which operate in pairs, each pair operating at a respective stalkway. In the form shown, the conveyors 24–27 comprise chain conveyors, each having a link chain 28 with a plurality of outwardly protruding lugs 29 thereon. The chain conveyors 24–27 also lie in forwardly and downwardly inclined planes beneath the housing 22 and above the snapping rolls 20. The chain conveyors 24 are mounted on suitably provided sprockets 30 which are journalled on the frame 19 of the picker unit. In the form shown, the uppermost chain-mounting sprocket 30a for each of the chains, is connected to the drive apparatus 31 for the unit which drives each of the sprockets 30a at an identical velocity and which is powered through the shaft 32 from the engine on the tractor unit 11. The driving apparatus 31 also supplies power to the snapping rolls 20, substantially in the manner shown in the aforementioned U.S. Patent 2,641,887.

It will be noted that the chain conveyors have conveying legs or runs 24a, 25a, 26a and 27a extending along the corresponding sides of the stalkways and traveling rearwardly therealong in the direction of arrow B, and it will be particularly noted that the lugs 29 project inwardly of the stalkway into overlapping relation with the other lugs 29 extending into the stalkway from the opposite side. It is pointed out that the lugs of the chains 24 and 25 in the stalkway 21 are spaced equally from each other.

It will be noted that the chain conveyors have gathering legs or runs 24b, 25b, 26b and 27b which extend substantially normal to the direction of the stalkways 21 and which are disposed slightly forwardly of the forward edge 23 of the housing, and each of said transversely extending gathering legs of the conveyor chains extends outwardly from the corresponding stalkway a distance very nearly approaching half the spacing between adjacent crop rows. It will be obvious that these gathering legs 24b . . . 27b travel inwardly toward the corresponding stalkway. It will be seen in FIG. 3 that the gathering legs of the chain conveyors are disposed in close proximity with the ground surface S, and it has been found desirable and successful to maintain the transverse gathering legs 24b . . . 27b of the chain conveyors approximately one inch above the ground surface. In order to maintain the gathering legs of the chain conveyors at the predetermined position with respect to the ground surface, a plurality of ground-engaging skids 33 are affixed as by welding to the corn picker unit frame 19 at positions slightly rearwardly of the gathering legs.

Figure 8:
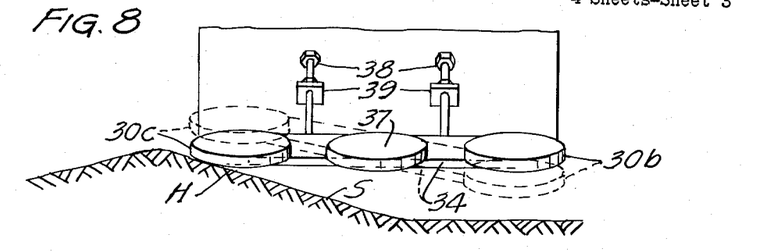
FIG. 8 is an enlarged detail diagrammatic front elevation view of a portion of the apparatus as viewed from the lines 8—8 in FIG. 3 and with certain of the parts eliminated for clarity of detail.

In order to provide for tilting of the gathering legs 24b . . . 27b, so as to maintain these gathering legs in closely spaced relation with the ground surface all along their lengths, and regardless of whether or not the ground is hilled along the crop row, the chain-mounting sprockets 30b and 30c at the opposite ends of each of the gathering legs of each of the chain conveyors, are mounted so as to be swingable in the plane of the conveyor chain about an axis extending normal to the plane and disposed midway between the rotation axes of the sprockets. To this end, the sprockets 30c and 30b are rotatable on suitable bearings 30d which are affixed by bolts 30e to a movable rigid bar 34 which is pivotally mounted on an extension portion 19a of the picker unit frame 19 by means of a pivot bolt 35 which permits the bar 34 to be swung about said pivot axis extending normal to the plane of the chain conveyor. The bolt 35 also mounts the bearing 36 for a flanged roller 37 which is somewhat smaller in diameter than the sprockets and gives mid-span support to the gathering leg of the chain conveyor. The bar 34 is maintained in a predetermined angular position by means of a pair of set screws 38 bearing against the edge of bar 34 at opposite sides of its pivot axis and threaded through suitable brackets 39 and lock nuts 40. It will be understood that because the chain conveyor is disposed in a forwardly and downwardly inclined plane, forward shifting of the sprocket 30b into the dotted line position shown in FIG. 7 also has the effect to lower the outside sprocket 30b as is illustrated in FIG. 8, and correspondingly the sprocket 30c is raised slightly. The shifting of the positions of the sprockets will not affect the tension on the conveyor chain, and the gathering leg of the conveyor chain will be tilted to the necessary degree to provide for uniform spacing along its lengths with respect to the ground surface which may be hilled as at H depicted in FIG. 8.

It will be noted that the bar 34 is slotted at 34a to accommodate some inward and outward shifting of the sprocket 30b for adjusting tension of the chain.

It will further be noted that an outer chain-guiding skid 41 is adjustable inwardly and outwardly to also provide for tensioning of the chain.

In each of the stalkways 21 is provided a pair of inwardly extending ear-supporting plates 42 respectively disposed on opposite sides of the stalkway and being sloped downwardly and inwardly but spaced apart at their inner edges 42a a distance to accommodate therebetween the stalks of corn. The plates 42 will be understood to be also forwardly and downwardly inclined in a fashion similar to the inclination of the snapping rolls and the chain conveyors, and the upper surfaces of the plates 42 are disposed adjacent the upper portions of the snapping rolls so as to permit ears of corn lying on the plates 42 to pass over the snapping rolls. It will be seen in FIG. 2 that the plates 42 extend rearwardly into close proximity with the snapping rolls and extend forwardly to the front ends of the stalkways 21.

In the use and operation of the present invention, the harvester 10 moves along the crop rows in the usual fashion with each of the stalkways 21 aligned with the corresponding crop row. The speed of the harvesting machine is regulated so that the chain conveyors 24–27 and lugs 29 traveling rearwardly along the stalkway have approximately zero forward velocity with respect to the ground surface and with respect to the upstanding corn stalks. The upstanding corn stalks in the crop row are moved into the stalkway and are held in an upright position by the conveyor chain lugs and by the cooperating inner edges 42a of the ear-supporting plates 42. Because the chain conveyors, plates 42 and snapping rolls are inclined, these portions will progressively move upwardly along the stationary stalk and the ears of corn will be removed by the snapping rolls and carried rearwardly in the conventional fashion into the elevator 17 and subsequently into the hulling, shelling or husking unit.

In the situation of a storm damaged field of corn, the corn stalks will be bent over in one direction or another. If the stalks have been bent over by the storm into the space between adjacent crop rows, the gathering legs 24b–27b of the chain conveyors move the stalks in cooperation with the overlying housing, lifting the stalks into upstanding condition, it being understood that the gathering legs 24b–27b of the chain conveyors move close to the ground surface and get beneath the corn stalks and substantially all portions of the stalks except the lowermost portion of the stem which extends up from the root. In the case of corn which is down diagonally toward the picker as the picker progresses along the row, the upper portions of the stalks are moved inwardly and upwardly as engaged by the lugs on the gathering legs of the chain.

It is to be particularly noted that as the downed stalks are uplifted into upright position, the whipping of the stalk is eliminated by operation of the present invention and the stalks are gently uplifted into upright position without whipping the ears off. The whipping of the stalks is restricted by the interaction of the two conveyor chains cooperating in the same stalkway. The uplifting action by the one chain is seemingly arrested by the other cooperating chain so as to prevent whipping of the stalks.

In the case of stalks which are downed in the row pointing toward the picker unit progressing therealong, the gathering legs and conveying legs of the chain conveyor, both of which are disposed in close proximity with the ground surface gently uplift the stalks into upright position as the stalks proceed rearwardly through the stalkway.

In the case of stalks which are down in the crop row and pointing away from the picker unit, the lugs on the cooperating conveyor chains move beneath the down portion of the stalk and lift the stalk gently into upright position.

It is to be particularly noted that even though the stalks lie flat on the ground, the operation of the gathering legs of the chain conveyors will cause these stalks and ears to be engaged and uplifted and move rearwardly along the stalkway.

The gathering legs of the chain conveyors will also gather loose ears of corn lying on the ground in or adjacent the crop row and will carry these ears into the stalkway and upwardly therealong.

It is particularly pointed out that in the event an ear of corn drops off the stalk which has been uplifted or which is in upright position in the stalkway, the ear may be carried on the chain lugs upwardly to the snapping rolls, but if the ear falls through the lugs, the ear will be supported upon the plates 42. Some of the ears which drop onto the plates 42 may be engaged by the chain conveyor lugs and be carried upwardly by the lugs onto the snapping rolls. However, many of the ears which fall upon the plates 42 will not be engaged by the lugs, but will be carried upwardly along the plates and onto the snapping rolls by subsequent stalks which pass upwardly along the stalkway and between the edges 42a of the plates 42. It will be noted that the downwardly convergent orientation of the plates 42 causes the ears thereon to roll toward the space between the plates, whereupon the ears are engaged and carried by the stalks moving rearwardly through the stalkway.

It has been found that in the use of the present invention, the collection of trash is no problem.

The present invention has been found to operate in the same fashion even though a snow cover exists on the ground to a depth of several inches. The lugs of the gathering legs work beneath the snow surface, gathering ears of corn and engaging and uplifting stalks in the manner hereinbefore described. There is no tendency for the picker unit to ride up over the surface of the snow.

In operational experience, it has been found that the present invention has substantially increased the usable yield of corn fields by a substantial degree. In one instance, in a field of several hundred acres, a conventional picker (of the type employing forwardly extending snouts) first went through the field and sixty-five bushels of corn per acre were harvested, and this picker pulled the wagon into which the shelled out corn is collected and the picker and wagon put the corn down badly. Subsequently, the picker employing the instant invention went through this field for the second time after the aforementioned conventional picker had supposedly completed harvesting the field, and the picker employing the present invention obtained an additional yield of fifteen bushels per acre, which at current market prices exceeds the cost of operating the picker through the field by approximately three times.

In another instance, a field of several hundred acres was picked by substantially the best picker of a particular brand on the market and in this instance, the corn initially was in good condition and the yield was approximately 70 bushels per acre. Again, the picker embodying the present invention was sent behind to reharvest the field and an additional seven bushels per acre were harvested, thereby accounting for a 10% increase in the usable yield of the particular field.

It has been experienced that with the use of the present invention, it makes no difference in the operational efficiency whether the picker momentarily moves off the crop row because the gathering legs, such as 24b and 26b, of the chain conveyor merely move the stalks transversely over to the stalkway, whereupon the opposite chain conveyors 25 and 28 arrest this transverse movement of the stalks and cause the stalks to stand upright and travel rearwardly through the stalkway in the conventional fashion.

An additional feature of the instant invention is provided at a location midway between the stalkways and crop rows for additionally uplifting stalks which are down and lying transversely out of the crop row. The housing 22 is slotted at 43 in intersecting relation with the front edge 23. A small chain 44 is oriented in a vertical plane and is mounted on sprockets 45 the lowermost of which is disposed so as to guide the chain into close proximity with the ground surface S. The sprockets 45 are secured to shafts 46 and 47 which are mounted in suitable bearings 48 on the picker frame 19 and the shaft 47 may be powered through a gear mechanism 49 and a sprocket 50 which meshes with the conveyor chain 26. The chain 44 has outstanding lugs 44a thereon which move in the direction of arrow D for uplifting stalks lying across the central portion of the space between the crop rows.

Figure 9:
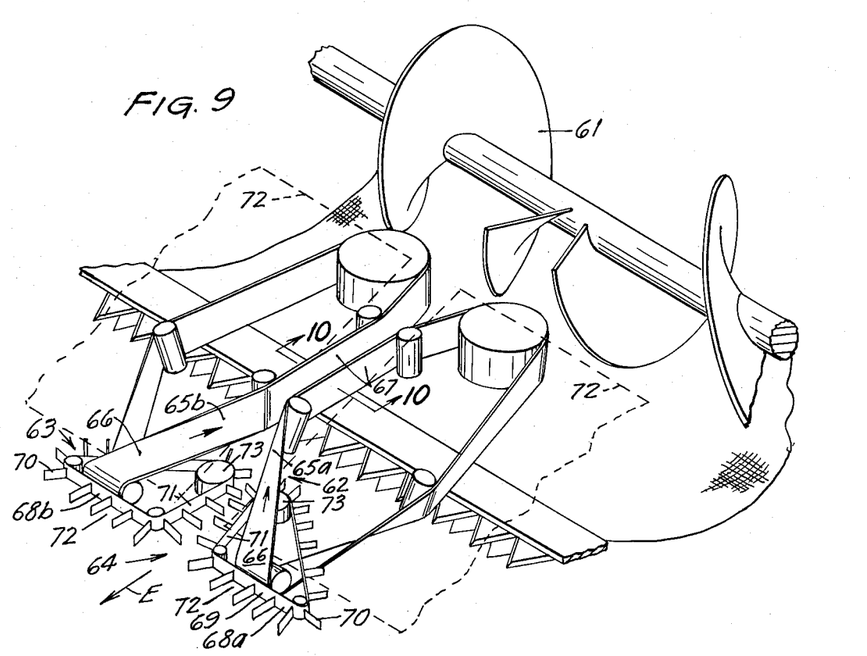
Figure 10:
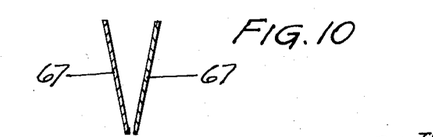
FIG. 10 is a section view taken at 10—10 in FIG. 9.

A modified form of the present invention is shown in FIG. 9 for use with row crops such as soybeans. It is known to be common practice in harvesting soybeans to cut the vines by means of a sickle-type cutter 60 and the vines, due to the forward movement of the implement, move into the header auger 61 and are subsequently carried by an elevator to the threshing portion of the combine. The sickle cutter 60 and header auger apparatus 61 is generally analogous to the snapping rolls 20 and conveyor 17 of the corn picker as the means actually harvesting or collecting the crop. In addition, the apparatus shown in FIG. 9 includes a pair of crop conveyors indicated in general by numerals 62 and 63 disposed on opposite sides of a stalkway 64. In the form shown, the conveyors 62 and 63 have belt conveyors 65a and 65b with diagonally inwardly and upwardly extending crop uplifting and conveying portions 66 and rearwardly moving, generally parallel crop conveying and holding portions 67 lying in downwardly convergent planes and disposed above the sickle bar cutter 60 for holding the vines of the crops upwardly away from the sickle bar as the stalks are severed. The conveyors 62 and 63 also include flighted chain conveyors 68a and 68b which may be constructed of small chains 69 with lugs or flights 70 thereon. The flighted chain conveyors 68a and 68b have fore-and-aft extending conveyor legs 71 on opposite sides of the stalkway 64 and spaced so that the flights or lugs 70 overlap with each other. The flighted chain conveyors 68a and 68b also have gathering legs 72 extending substantially normal to the stalkway and to the direction of travel which is indicated by arrow E and moving inwardly toward the stalkway for cooperating with the belt conveyor portion 65a and 65b in moving the vine inwardly and upwardly into and through the stalkway 64 as the machine progresses along the crop row. A housing 72 (shown in dotted lines) is provided in overlying relation with the chain conveyors 68a and 68b but in underlying relation with diagonal portions 66 of the belt conveyors 65a and 65b.

In this apparatus, the speed of the flighted conveyor portions 68a and 68b is adjusted so that the flights 70 in the conveying legs 71 are substantially stationary with respect to the ground, and likewise, the conveying portions 67 of the belt conveyors 65a and 65b are also substantially stationary with respect to the ground as the machine moves along.

As the machine progressively moves down the crop row, the vines are moved inwardly, and upwardly, and therefore uplifted as they pass rearwardly along the stalkway 64 and the upper portions of the vines are flexed inwardly and effectively clamped by the holding portions 67 of the belts 65a and 65b.

In the form shown in FIG. 9, the flighted conveyors 68a and 68b lie in forwardly and downwardly inclined planes and are individually rotatably adjustable about axes extending through the sprockets 73 and normal to the plane of the flighted conveyors 68a and 68b. By adjusting the positions of these flighted conveyors 68a and 68b, the gathering legs 72 thereof may be tilted so that these conveyor legs will remain in close proximity with the ground surface all along their lengths even though the ground may be hilled along the crop row.

Figures 11, 12:
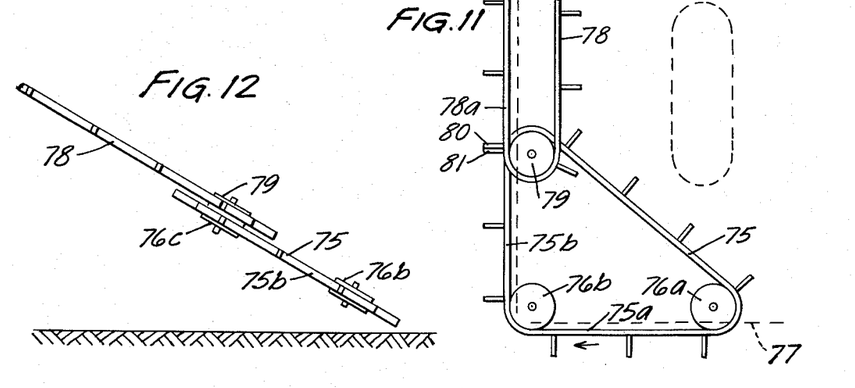
FIG. 11 is a diagrammatic plan view of a modified form of chain conveyor arrangement which may be employed within the concept of the present invention.
FIG. 12 is a diagrammatic side elevation view of the chain conveyor arrangement shown in FIG. 11.

An alternate arrangement of the chains is shown diagrammatically in FIGS. 11 and 12. The gathering chain 75 has a transversely inwardly extending and moving gathering leg 75a and an upwardly and rearwardly extending conveying leg 75b, and the gathering chain 75 is carried on sprockets 76a, 76b, and 76c. Of course suitable frame structure is provided for mounting the sprockets. The gathering leg 75a projects forwardly of the forward edge of the housing 77 (shown in dotted lines and corresponding to housing 22 in FIG. 1). A separate conveyor chain 78 has a conveying leg 78a extending and traveling rearwardly along one side of the stalkway, and one of the mounting sprockets 79 of the conveyor chain 78 is shown and the sprocket 79 is affixed as by welding to the sprocket 76c of the gathering chain. The teeth on the sprockets 76c and 79 are so oriented as to cause the conveyor chain lugs 80 to slightly lead the gathering chain lugs 81 as the separate chains pass around the sprockets 79 and 86c respectively. The purpose for the leading arrangement of the lug 80 in relation to the lug 81 is to prevent shearing or otherwise damaging the stalks of the crops as the changeover is effected from one chain to the other. Of course it will be understood that a similar gathering chain and conveyor chain arrangement is provided on the other side of the stalkway in the manner disclosed in FIG. 1.

Figure 13:
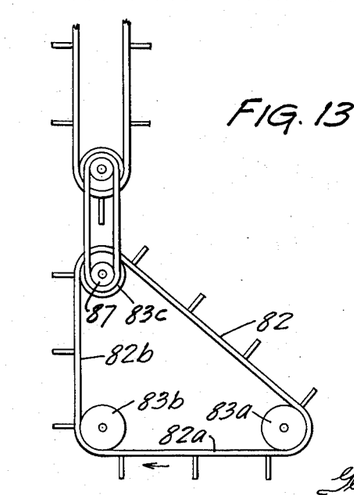
FIG. 13 is a diagrammatic plan view of another modified form of the chain conveyor arrangement which may be employed within the concept of the present invention.

In the form shown in FIG. 13, the gathering chain 82 is arranged to travel a triangular course and has a transversely inwardly extending and traveling gathering leg 82a and a rearwardly extending leg 82b. The gathering chain 82 is mounted on the sprockets 83a, 83b and 83c, and the sprocket 83c is spaced from the adjacent sprocket 84 of the conveyor chain 85, but is driven therefrom by means of a roller chain 86 mounted on suitable sprockets 87 which are respectively affixed to the sprockets 84 and 83c. In this construction, the chains 82 and 85 lie in substantially the same rearwardly and upwardly inclined plane beneath the housing. The separated relationship between the gathering chain and the conveying chain 85 tends to minimize the collection of trash when the machine is in operation. Of course corresponding conveyor gathering chains are also provided at the other side of the stalkway as in the other forms of the invention in the manner disclosed in FIG. 1.

Figure 14:
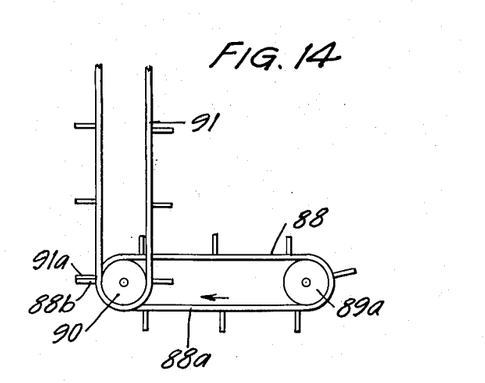
FIG. 14 is a diagrammatic plan view of still another modified form of chain conveyor arrangement which may be employed within the concept of the present invention.
Figure 15:
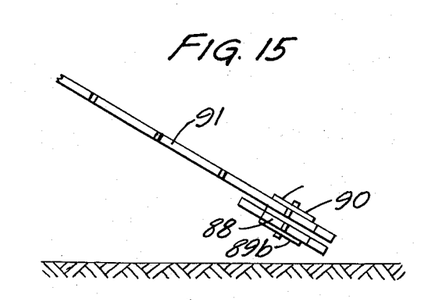
FIG. 15 is a diagrammatic side elevation view of the chain conveyor arrangement shown in FIG. 14.

With regard to the form of the invention shown in FIGS. 14 and 15, the gathering chain 88 has a gathering leg 88a which extends and travels inwardly to the stalkway as in the other forms of the invention and the chain 88 is mounted on sprockets 89a and 89b, the latter of which is affixed as by welding in predetermined orientation with the sprocket 90 which mounts the lower end of conveyor chain 91. The relative orientation of the sprockets 89b and 90 causes the conveyor chain legs 91a to lead slightly, the gathering chain lugs 88b as the lugs move around the sprockets 89b and 90 so as to prevent a shearing or otherwise damaging action on the stalks being moved by the chains.

It will, of course, be understood that various changes may be made in the form, details, arrangement and proportions of the parts without departing from the scope of our invention which consists of the matter shown and described herein and set forth in the appended claims.

What we claim is:

1. A harvester for use with row crops of the type having the fruit supported at an elevated position on the stalk, comprising a mobile supporting structure to move along the ground, a harvesting unit on the structure and including crop and stalk supporting and guiding means above the ground surface and defining a fore-and-aft stalkway with an open stalk-receiving forward end, means spaced rearwardly from said forward end for engaging the stalks in the stalkway and harvesting the fruit, said unit including a pair of elongate and continuous conveyors respectively disposed on opposite sides of the stalkway, each of said conveyors having a gathering leg extending and traveling transversely of and inwardly to the stalkway in closely spaced relation with the ground surface, each of said gathering legs being disposed forwardly of the foremost portion of said supporting and guiding means, supporting means on the harvesting unit and spaced rearwardly of the gathering legs of said conveyors thereby leaving the front of the harvesting unit free of structure forwardly of the gathering legs and thereby causing the gathering legs of the conveyors to first engage the crops as the harvester moves along the crop row, and means for driving said conveyors.

2. A harvester for use with row crops of the type having the fruit supported at an elevated position on the stalk, comprising a mobile supporting structure to move along the ground, a harvesting unit on the structure and including a forwardly and downwardly inclined housing defining a fore-and-aft stalkway with an open forward end, said unit also having means in said stalkway for engaging the crop and harvesting the fruit, the foremost portion of the housing being disposed adjacent the ground surface, said unit also including a pair of elongate continuous conveyors respectively disposed on opposite sides of the stalkway and beneath the housing, each of said conveyors having a gathering leg extending and traveling transversely of and inwardly to the stalkway and in closely spaced relation with the ground surface, each of said gathering legs being disposed forwardly of the foremost portion of the housing, supporting means on the harvesting unit and spaced rearwardly of the gathering legs of said conveyors then by leaving the front of the harvesting unit free of structure forwardly of the gathering legs and thereby causing the gathering legs of the conveyors to first engage the crops as the harvester moves along the crop row, and means for driving said conveyors.

3. A harvester for use with row crops of the type having the fruit supported at an elevated position on the stalk, comprising a supporting structure having ground travel support wheels, a harvesting unit on the structure and including a forwardly and downwardly inclined housing defining a fore-and-aft stalkway with an open forward end, said unit also having means in said stalkway for engaging the crop and harvesting the fruit, the foremost portion of the housing being disposed adjacent the ground surface, said unit also including a pair of continuous conveyor chains having lugs thereon and being respectively disposed on opposite sides of the stalkway and beneath the housing, each of said chains having a gathering leg extending and traveling transversely of and inwardly to the stalkway and in closely spaced relation with the ground surface, the lugs on said leg of each chain protruding forwardly of the foremost portion of the housing, supporting means on the harvesting unit and spaced rearwardly of the gathering legs of said conveyors thereby leaving the front of the harvesting unit free of structure forwardly of said gathering legs and thereby causing the lugs on the gathering legs of the conveyors to first engage the crops as the harvester moves along the crop row, and means for driving said chains.

4. A harvester for use with row crops of the type having the fruit attached to the stalk at an elevated position above the ground surface, comprising a supporting structure having ground travel support wheels, a harvesting unit on the structure and including crop and stalk supporting and guiding means above the ground surface and defining a fore-and-aft stalkway with an open stalk-receiving forward end, means spaced rearwardly from said forward end for engaging the stalks in the stalkway for harvesting the fruit, said unit including a pair of elongate conveyor means respectively disposed on opposite sides of the stalkway, each of said conveyor means having a gathering leg extending and traveling transversely of and inwardly to the stalkway and in closely spaced relation with the ground surface, each of said gathering legs being disposed forwardly of the foremost portion of said supporting and guiding means, each of said conveyor means also having a conveying leg extending and traveling rearwardly along the corresponding side of the stalkway from the gathering leg, supporting means on the harvesting unit and spaced rearwardly of the gathering legs of said conveyors thereby leaving the front of the harvesting unit free of structure forwardly of the gathering legs and thereby causing the gathering legs of the conveyors to first engage the crops as the harvester moves along the crop row, and means for driving said conveyor means.

5. A corn harvester, comprising a supporting structure having ground travel support wheels, a corn picking unit including a forwardly and downwardly inclined housing defining a fore-and-aft stalkway having snapping rolls therein, said unit also including a pair of continuous conveyor chains having lugs and respectively disposed at opposite sides of the stalkway in inclined planes beneath the housing, each of said chains having a fore-and-aft leg extending along the corresponding side of said stalkway and traveling rearwardly and each of said chains also having a gathering leg extending and traveling transversely of and inwardly to the stalkway and in closely spaced relation with the ground, the lugs on said gathering leg extending forwardly of the foremost portion of the housing, supporting means on the corn-picking unit and spaced rearwardly of the gathering legs of said chains thereby leaving the front of the picking unit free of structure forwardly of said gathering legs and the lugs thereon and thereby also causing the lugs on the gathering legs of said chains to first engage the corn as the harvester moves along the crop row, and means for driving said chains.

6. A corn harvester, comprising a supporting structure having ground travel support wheels, a corn picking unit including a forwardly and downwardly inclined housing defining a fore-and-aft stalkway with an open forward end, the housing having a forward edge extending transversely of the stalkway and disposed adjacent the ground surface, said unit also having means in the stalkway for gathering the ears of corn, said unit also including a pair of continuous conveyor chains having lugs thereon and being respectively disposed on opposite sides of the stalkway and beneath the housing, each of said chains having a gathering leg extending and traveling transversely of and inwardly to the stalkway and in closely spaced relation with the ground surface, the lugs on said gathering leg extending forwardly of the forward edge of the housing, supporting means on the corn-picking unit and spaced rearwardly of the gathering legs of said chains thereby leaving the front of the picking unit free of structure forwardly of said gathering legs and the lugs thereon also causing the lugs on the gathering legs of said chains to first engage the corn as the harvester moves along the crop row, and means for driving said chains.

7. A corn harvester, comprising a supporting structure having ground travel support wheels, a corn picking unit on the structure and including a forwardly and downwardly inclined housing having a forward edge portion disposed adjacent the ground surface and said housing defining a fore-and-aft stalkway opening forwardly through said edge portion, said unit also having means in said stalkway for engaging and gathering the ears of corn, said unit also including a pair of continuous conveyor chains having lugs thereon and being respectively disposed on opposite sides of the stalkway in forwardly and downwardly inclined planes and beneath the housing, each of said chains having a gathering leg extending and traveling transversely of and inwardly to the stalkway in closely spaced relation with the ground surface, the lugs on said leg of each chain protruding forwardly of the forward edge portion of the housing, supporting means on the corn-picking unit and spaced rearwardly of the gathering legs of said chains thereby leaving the front of the picking unit free of structure forwardly of said gathering legs and the lugs thereon and thereby also causing the lugs on the gathering legs of said chains to first engage the corn as the harvester moves along the crop row, means mounting and driving each of said chains and including a pair of sprockets at the opposite ends of said gathering leg, rigid means adjustably and swingably mounting said sprockets for swinging movement in said plane and about an axis extending normal to the plane to facilitate tilting of said leg to conform to the ground surface contour along a hilled crop row.

8. The invention set forth in claim 7 wherein said axis about which said sprockets move, is disposed midway between said sprockets.

9. The invention set forth in claim 5 and said support means including a plurality of ground-engaging skids on the unit and disposed rearwardly of said gathering legs, said skids retaining said gathering legs on said chains at a predetermined elevation with respect to the ground surface.

10. A corn harvester, comprising a supporting structure having ground travel support wheels, a corn picking unit including a forwardly and downwardly inclined housing defining a fore-and-aft stalkway with an open forward end and having inclined snapping rolls in the stalkway and spaced rearwardly from the open forward end thereof, the foremost portion of the housing being disposed adjacent the ground surface, said unit also including a pair of continuous conveyor chains having lugs thereon and being respectively disposed on opposite sides of the stalkway in forwardly and downwardly inclined planes beneath the housing, each of said chains also having a gathering leg extending and traveling transversely of and inwardly to the stalkway in closely spaced relation with the ground surface, the lugs on said gathering leg extending forwardly of the foremost portion of the housing, and each of said chains also having a fore-and-aft conveying leg extending along the corresponding side of the stalkway and rearwardly from the corresponding gathering leg into overlying relation with the corresponding snapping roll, said conveying legs traveling rearwardly along the stalkway, supporting means on the corn-picking unit and spaced rearwardly of the gathering legs of said chains thereby leaving the front of the picking unit free of structure forwardly of said gathering legs and the lugs thereon and thereby also causing the lugs on the gathering legs of said chains to first engage the corn as the harvester moves along the crop row, means for driving said chains, and a pair of downwardly and forwardly inclined ear-supporting plates on the unit and respectively disposed on opposite sides of the stalkway forwardly of the snapping rolls and underlying the conveying legs of said chains whereby to retain fallen ears at a position wherein the ears may be moved rearwardly through the stalkway by the stalks and ears carried by said chains.

11. A corn harvester, comprising a supporting structure having ground travel support wheels, a corn picking unit adjustably supported on said structure, said unit including a housing defining a fore-and-aft stalkway having an open forward end, said housing extending generally forwardly and downwardly and having a forward edge portion extending substantially normal to the stalkway and adjacent the ground surface, said picker unit also having forwardly and downwardly inclined snapping rolls in the stalkway and spaced rearwardly from the forward end of the stalkway, a pair of spaced and inclined ear-supporting plates in the stalkway and on opposite sides thereof and forwardly of the snapping rolls, said unit also including a pair of conveyor chains having lugs and respectively disposed at opposite sides of the stalkway in forwardly and downwardly inclined planes beneath the housing, each of said chains having ag athering leg extending normal to said stalkway and beneath said forward edge portion in closely spaced relation with the ground surface, the lugs on said gathering leg extending forwardly of said forward edge portion of the housing, each of said chains also having a fore-and-aft leg extending and traveling rearwardly from the gathering leg along the corresponding side of said stalkway above the ear-supporting plate and the snapping roll with the lugs extending into the stalkway, each lug of said leg being spaced midway between a pair of lugs of the other chain and at a distance therefrom less than the diameter of an ear of corn, means mounting and driving said chains and including for each chain, a pair of sprockets at the opposite ends of said gathering leg and disposed in the inclined plane of the chain, supporting means adjustably mounting each pair of said sprockets for swinging movement about a pivot axis extending normal to said plane and located midway between said sprockets whereby to permit adjustment of one of said sprockets forwardly and downwardly from the other sprocket, a pair of flanged chain-guiding wheels each on said supporting means at a position between said sprockets and engaging the corresponding gathering leg of the corresponding gathering leg of the chain to prevent rearward and downward sagging thereof, and a plurality of ground-engaging skids on said picker unit and rearwardly of said gathering legs of the chains and supporting the same to maintain the gathering legs of said chains in closely spaced relation with the ground surface.

12. A harvester for use with row crops of the type having the fruit supported at an elevated position on the stalk, comprising a mobile supporting structure to move along the ground, a harvesting unit on the structure and including a forwardly and downwardly inclined housing defining a fore-and-aft stalkway with an open forward end, said unit also having means in the stalkway for engaging the crop and harvesting the fruit, the foremost portion of the housing being disposed adjacent the ground surface, said unit also including a pair of elongate continuous conveyors respectively disposed on opposite sides of the stalkway and beneath the housing, each of said conveyors having a gathering leg with an inner end adjacent the stalkway and having an outer end spaced outwardly from the stalkway, each of said gathering legs extending and traveling transversely of and inwardly to the stalkway and in closely spaced relation with the ground surface, each of said gathering legs being disposed forwardly of the foremost portion of the housing, supporting means on the harvesting unit and spaced rearwardly of the gathering legs of said conveyors thereby leaving the front of the harvesting unit free of structure forwardly of the gathering legs and thereby causing the gathering legs of the conveyors to first engage the crops as the harvester moves along the crop row, movable stalk-lifting apparatus disposed adjacent the outer end of one of said conveyors and including a plurality of tines located in a substantially vertical plane, means mounting and moving said tines through an orbital path to produce upward movement of the forwardly projecting tines adjacent the outer end of said gathering leg, and means for driving said conveyor and said tines.

13. A harvester for use with row crops of the type having the fruit supported at an elevated position on the stalk, comprising a mobile supporting structure to move along the ground, a harvesting unit on the structure and including a forwardly and downwardly inclined housing defining a fore-and-aft stalkway with an open forward end, said unit also having means in said stalkway for engaging the crop and harvesting the fruit, the foremost portion of the housing being disposed adjacent the ground surface, said unit also including a pair of elongate continuous conveyors respectively disposed on opposite sides of the stalkway and beneath the housing, each of said conveyors having a gathering leg extending and traveling transversely of and inwardly to the stalkway and in closely spaced relation with the ground surface, each of said gathering legs being disposed forwardly of the foremost portion of the housing, supporting means on the harvesting unit and spaced rearwardly of the gathering legs of said conveyors thereby leaving the front of the harvesting unit free of structure forwardly of the gathering legs and thereby causing the gathering legs of the conveyors to first engage the crops as the harvester moves along the crop row, a pair of elongate continuous belt conveyors respectively disposed on opposite sides of the stalkway, each of said conveyors having a crop moving leg extending diagonally upwardly and rearwardly from a corresponding gathering leg and in overlying relation with the housing and also extending and traveling diagonally rearwardly and inwardly to the stalkway, and each of said belt conveyors also having a crop-holding leg extending and traveling rearwardly from said crop-moving leg and rearwardly along the stalkway adjacent said harvesting means and in closely spaced relation with the corresponding holding leg of the other belt conveyor to cooperate therewith in holding the crop therebetween while said means engages the crop and harvests the fruit, and means for driving said conveyors.

14. The invention set forth in claim 13 wherein said holding legs of the belt conveyors lie in downwardly convergent planes for holding the stalks.

15. A harvester for use with row crops of the type having the fruit supported at an elevated position on the stalk, comprising a mobile supporting structure to move along the ground, a harvesting unit on the structure and including a forwardly and downwardly inclined housing defining a fore-and-aft stalkway with an open forward end, said unit also having means in said stalkway for engaging the crop and harvesting the fruit, the foremost portion of the housing being disposed adjacent the ground surface, said unit also including a pair of elongate continuous conveyors respectively disposed on opposite sides of the stalkway and beneath the housing, each of said conveyors having a gathering leg extending and traveling transversely of and inwardly to the stalkway in closely spaced relation with the ground surface, each of said gathering legs being disposed forwardly of the foremost portion of the housing, supporting means on the harvesting unit and spaced rearwardly of the gathering legs of said conveyors thereby leaving the front of the harvesting unit free of structure forwardly of the gathering legs and thereby causing the gathering legs of the conveyors to first engage the crops as the harvester moves along the crop row, a pair of elongate and continuous belt conveyors respectively disposed on opposite sides of the stalkway, each of said belt conveyors having a crop uplifting and moving leg adjacent the corresponding gathering leg and extending and traveling diagonally upwardly, rearwardly and inwardly to the stalkway for uplifting and moving the crop into the stalkway, and means for driving said conveyors.

References Cited in the file of this patent

UNITED STATES PATENTS

| | | |
|---|---|---|
| 2,134,867 | Fergason | Nov. 1, 1938 |
| 2,835,097 | Sullivan | May 20, 1957 |
| 2,948,100 | McEachern | Aug. 9, 1960 |